Nov. 18, 1958 W. T. GRUBB, JR 2,861,116
PRIMARY CELL
Filed April 9, 1957
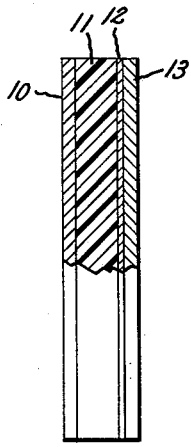
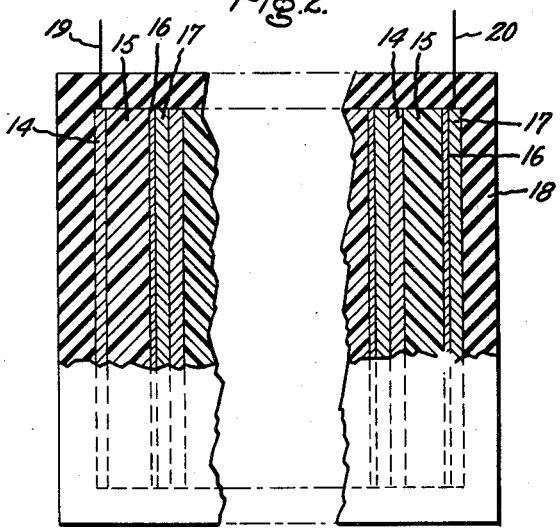
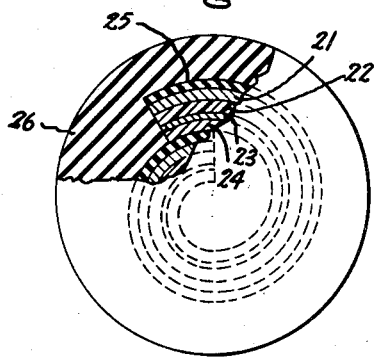
Inventor:
Willard T. Grubb, Jr.
by Paul A. Frank
His Attorney.

United States Patent Office 2,861,116
Patented Nov. 18, 1958

2,861,116

PRIMARY CELL

Willard T. Grubb, Jr., Schenectady, N. Y., assignor to General Electric Company, a corporation of New York Application April 9, 1957, Serial No. 651,792

20 Claims. (Cl. 136—106)

This invention relates to primary electric cells. More particularly this invention relates to new and improved solid state primary electric cells.

The need for solid state electric cells as distinguished from wet electric cells has long been recognized in the art. These solid state electric cells are much more versatile in application and design than are the common wet cells. In solid state electric cells and in batteries comprising a number of cells in series, it is desirable to have a long shelf life, a high coulomb capacity per unit volume and a high voltage per unit length of battery. This type of battery is particularly valuable where a high voltage is required at a relatively low current.

There have been many attempts to solve the problem of providing the optimum solid state electric cell. The most obvious attempt resulted in the common dry cell of the flashlight battery variety. While not a true "dry" cell, since the flashlight battery does contain some liquid in paste form, the flashlight battery is sometimes referred to as a "dry" cell. Although the flashlight battery does provide a high coulomb capacity per unit volume, the flashlight battery is very deficient in shelf life and in voltage per unit length. Therefore, the conventional flashlight battery is unsatisfactory in applications where a high voltage per unit length is required after an extended period of storage.

Another type of solid state "dry" cell is the cell made up of two different electrodes with a crystalline, ion conducting material sandwiched between the electrodes. A typical cell of this type is a crystalline electrolyte cell. However, this latter type of cell, while having good shelf life and good coulomb capacity per unit volume, is somewhat deficient in voltage per unit length, since the conductivity of the crystalline electrolyte is generally so low that the voltage of the cell under load is only a small fraction of the theoretical voltage obtainable from the electrode reactions involved.

In my copending application Serial No. 518,750, filed June 29, 1955, and assigned to the same assignee as the present invention, there is described and claimed a solid state electric cell having excellent shelf life and relatively high voltage per unit length. This cell consists of two metal electrodes of different composition with two substantially saturated solvated cation permeable ion exchange resin membranes sandwiched between the electrodes. The mobile cation of the first membrane is the cation of the metal of its adjacent electrode and the mobile cation of the second membrane is the cation of the metal of the second electrode. Although the cell of this copending application is satisfactory in many applications, it does not have as high a coulomb capacity per unit volume as is desirable for some applications since the capacity of the cell is limited by the number of mobile cations in the ion permeable membrane.

The object of the present invention is to provide an improved solid state primary electric cell having long shelf life, high coulomb capacity per unit volume and high voltage per unit length.

This and other objects of my invention are accomplished by providing a solid state primary electric cell comprising a metallic anode, a substantially saturated solvated cation permeable ion exchange resin membrane electrolyte having as its mobile cation the ion of the metallic anode, and a metal oxide depolarizer cathode.

The features of my invention which I believe to be novel are set forth with particularity in the appended claims. My invention itself, both as to its structure and method of operation, together with further objects and advantages thereof may be best understood by reference to the following description taken in connection with the accompanying drawing in which:

Fig. 1 is a diagrammatic illustration, partly in section, of one embodiment of my invention;

Fig. 2 is an illustration of a battery, partly in section, made up of a plurality of the cells of the present invention;

Fig. 3 is a schematic illustration of a rolled, cylindrical dry cell within the scope of the present invention; and Fig. 4 is a view of the cell of Fig. 3 prior to rolling and encasing.

The cells of the present invention are based upon my discovery that a cell having long shelf life, a high capacity per unit volume, and a high voltage per unit length is obtained if a particular type of cation exchange resin membrane is employed as the sole electrolyte between a metallic anode and a metal oxide depolarizer cathode. This resin membrane is a substantially saturated, solvated cation permeable ion exchange resin membrane having as its mobile cation the cation of the metal of the anode. The desirable properties of the primary cells of the present invention are completely unpredictable from a knowledge of the prior art since the half cell reactions which take place in the primary cell of the present invention are necessarily different from the half cell reactions observed in conventional batteries containing metallic anodes, a paste electrolyte and a metal oxide depolarizer cathode. In these prior art cells the half cell reactions involve both a mobile anion and a mobile cation since the electrolyte material allows both anions and cations to move. Thus, in the conventional flashlight battery which comprises a zinc anode, an aqueous ammonium chloride electrolyte and a manganese dioxide depolarizer cathode, the anode reaction involves zinc and hydroxyl ions while the cathode reaction involves manganese dioxide and hydrogen ions. In the primary cells of the present invention there are no mobile anions. And therefore, the reaction at both the anode and cathode necessarily involve the single mobile cation present in the electrolyte. In view of this fact, it is completely unexpected that a cell reaction should take place with the primary cells of the present invention or that this cell reaction should provide a voltage so close to the voltages obtained from conventional flashlight batteries of similar construction. That the primary cells of the present invention do give substantially the same voltages as prior art cells involving aqueous electrolytes is illustrated by the fact that a cell of the present invention employing a zinc anode and a manganese dioxide depolarizer cathode produced an open circuit voltage of about 1.58 volts as compared with the 1.5 volts obtained from a standard flashlight battery.

The cation exchange resins employed in the practice of the present invention are polymeric materials which include in their polymeric structure dissociable ionizable radicals, the anion component of which is fixed into or retained by the polymeric matrix with the cation component being a mobile and replaceable ion electrostatically associated with the fixed component. The ability of the cation to be replaced under appropriate conditions by other cations imparts ion exchange characteristics to these materials. These ion exchange resins are used in the present invention in membrane form. These membranes are sheets having a thickness much smaller than either of the other two dimensions. These ion exchange resin membranes are characterized by their insolubility in water and both polar and non-polar organic solvents. This insolubility results from the cross-linked character of the synthetic polymer materials employed in the membrane structure. As is well known, ion exchange resins are prepared by copolymerizing a mixture of ingredients, one of which contains an ionic substituent, or by reacting an ionic material with a resin polymerizate. In the case of cation exchange resins these ionic substituents are acidic groups such as the sulfonic acid group, the carboxyl group and the like. The ionizable group is attached to a polymeric material such as a phenol-aldehyde resin, a polystyrene-divinyl benzene copolymer, or the like. Thus, a typical cation exchange resin may be prepared by copolymerizing m-phenol sulfonic acid with formaldehyde. The preparation and properties of a number of different types of cation exchange resins is described throughout the literature and in particular in "Ion Exchange," F. C. Nachod, Academic Press Inc., New York (1950); "Ion Exchange Resins," R. Kunin and R. J. Myers, John Wiley & Sons, Inc., New York (1950); and in U. S. patents such as 2,366,007—D'Alelio; 2,663,702—Kropa; 2,664,379—Hutchinson; 2,678,306—Ferris; 2,658,042—Johnson; 2,681,319—Bodamer; and 2,681,320—Bodamer. The formation of these ion exchange resins into sheet or membrane form is also well known in the art and is described, for example, in "Amberplex Ion Permeable Membranes," Rohm and Haas Company, Philadelphia (1952), and in references mentioned in the aforementioned Rohm and Haas publication. In addition, the preparation of a number of different types of ion exchange resin membranes is described in Patent 2,636,851—Juda et al. and in Patent 2,702,272—Kasper. In general, these ion exchange resin membranes may be formed by one of two methods. In the first method the ion exchange resin is cast or molded into membrane or sheet form without the addition of other bonding materials. In the second method the ion exchange resins are incorporated into binders which generally comprise thermoplastic resins such as polyethylene, polyvinyl chloride, methyl methacrylate, etc., and the ion exchange resin and binder are cast or molded into membrane form.

It should be understood that the present invention is not limited to any particular type of ion exchange resin membrane. Any ion exchange resin membrane having mobile cations is satisfactory in the practice of the present invention.

As a general rule, ion exchange resins are formed in aqueous solutions or suspensions of various types of organic compounds so that when the membrane is formed it is substantially saturated with water. Thus, a phenol sulfonic acid formaldehyde ion exchange resin is found to contain a plurality of reactive sites consisting of —$SO_3H$ radicals attached to the resin matrix with sufficient water being held in the matrix so that the hydrogen ion is extremely mobile in the matrix. In this form the resin is described as being substantially "solvated." By "solvated" it is meant that the resin contains enough of the solvation medium to substantially saturate the resin but not enough to make the resin wet. In this "solvated" state there is no tendency for the water to flow or drip from the resin. Thus, the substantially solvated resins employed in the practice of the present invention may be described as "dry." These resins are dry since the water present in the resin is held to the resin by secondary Van der Waals forces.

These resins can be made "bone dry" by subjecting the resin to high vacuum at elevated or room temperature. In the "bone dry" condition the resin contains only a trace of water, but this water is combined with the resin and does not allow mobility of the hydrogen ion in the resin. After being made bone dry the resin may be resolvated by soaking the resin in the solvation medium until substantial saturation has been obtained. A "bone dry" resin may be resolvated with water or any other polar liquid depending on the particular type of resin employed. The only requirement of the solvating liquid is that it be polar in nature. In addition to water, polar liquids such as dimethyl formamide, alcohols, e. g. ethylene glycol, ethyl alcohol, n-propyl alcohol, n-butyl alcohol, the monomethyl ether of ethylene glycol, etc., may be employed. The solvating liquid can also comprise mixtures of more than one of the solvating materials. Thus, mixtures of water with any of the aforementioned solvating liquids may be employed. Where a mixture of water and another polar liquid is employed as solvating medium, I prefer to employ about 10 percent by volume of water and 90 percent by volume of the second liquid.

The mobile cation in the ion permeable membranes employed in the practice of the present invention may be replaced by other cations by well known methods. As usually obtained, ion exchange resin membranes are in the hydrogen ion form. The hydrogen ions in these membranes may be replaced with a metallic cation by soaking the resin in an aqueous solution containing the metallic cation. The type of aqueous solution employed for the ion exchange is not critical so long as the metal cation is in solution. Aqueous solutions of metal salts such as chlorides, sulfates and nitrates are satisfactory for this purpose. For example, to replace the mobile hydrogen ion of an ion permeable resin membrane with zinc ions, the hydrogen ion membrane is soaked in an aqueous zinc sulfate solution for three to four hours. At the end of this time the mobile hydrogen ions are replaced by mobile zinc ions. This same procedure may be followed to substitute any metallic cation for mobile hydrogen ions of a cation exchange resin membrane. After converting the resin membrane to its metal cation form, the membrane is washed several times with water to remove all traces of the salt solution from the membrane. If the membrane is to be employed with water as the solvating medium, the membrane is then ready for use in the present invention. If it is desired to employ some medium other than water as the solvating medium, the water in the membrane is replaced partially or completely by the desired solvating medium. When it is desired to replace all of the water with another solvating medium, the water may be removed by subjecting the water solvated membrane to a high vacuum. After the membrane reaches its bone dry state it is then soaked in the desired solvating medium until the resin is resolvated. Alternatively, where the solvating medium has a higher boiling point than the water in the membrane, the evacuation may take place in the presence of the high boiling solvating medium and as the water is removed from the membrane by the vacuum the high boiling solvating medium goes into the resin.

Where it is desired to replace only a portion of the water with the solvating medium the water solvated ion permeable resin membrane may be soaked in the new solvating medium until an equilibrium is established between the solvating medium in the resin and the solution in which the resin is being soaked.

The cells of the present invention may be best understood by reference to Fig. 1 which is a view, partly in section, of a cell of the present invention. This cell comprises a metal anode 10, an ion exchange resin membrane electrolyte 11 in which the mobile cation is the cation of the metal of anode 10, and a layer of metal oxide depolarizer 12. In addition, the cells of the present invention conveniently employ a second inert electrode 13, which does not enter into the cell reaction but which provides a convenient method of completing the external electrical circuit between anode 10 and depolarizer cathode 12. As shown in Fig. 1 the ion exchange resin membrane electrolyte 11 is sandwiched between anode 10 and cathode 12. The elements which comprise the cell of Fig. 1 may be held together by any suitable means (not shown) such as, for example, an insulated clamp or by encasing the cell in a suitable insulating material, such as a synthetic resinous material.

Almost any combination of anode material and metal oxide depolarizer cathode material may be employed in the practice of the present invention. The only positive requirement of the cells of the present invention is that the metal of which anode 10 is constructed have an oxidation-reduction potential more positive than the oxidation-reduction potential of the cathode material. Preferably, I employ as an anode material a metal having an oxidation-reduction potential between the oxidation-reduction potential of magnesium, which is 2.40 volts, and the oxidation-reduction potential of copper, which is —0.337 volt. Among the preferred materials for anode 10 are nickel, lead, cadmium, zinc, and magnesium.

The metal oxide depolarizer cathode 12 may also be constructed of an almost unlimited number of materials. The only restriction on the metal oxide cathode is that the cathode not react with the synthetic resin from which the electrolyte 11 is formed. Suitable cathode materials include, for example, manganese dioxide, silver oxide, lead dioxide, nickel oxide, mercuric oxide, vanadium pentoxide, etc. Since the metal oxide cathodes have low mechanical strength and low conductivity, it is most convenient to employ these oxides as coatings on an inert electrode such as inert electrode 13 of Fig. 1. Inert electrode 13 may also be formed of a wide range of materials, the only limitation on its material of construction being that the electrode 13 is inert to the other cell elements. Suitable materials of construction for electrode 13 include, for example, platinum, palladium, tantalum, molybdenum, silver, nickel, lead, gold, titanium, zirconium, carbon etc.

From the above description, it is seen that the metal oxide depolarizer cathode 12 and inert electrode 13 are commonly a composite element. This composite element or assembly may be formed in any well known manner. Thus, the metal oxide may be formed on the inert metal electrode by electrodeposition, by anodization of a suitable metal, by chemical oxidation of a suitable metal electrode material or by deposition from solutions or suspensions.

The size and shape of the elements comprising the cells of the present invention may vary within extremely wide limits. However, in the preferred embodiment of my invention the various elements comprising the cell are very thin so that a high voltage per unit length is obtained. Thus, anode 10 is preferably formed of a metal foil, for example, a foil of from 0.5 to 3 mils in thickness. Electrolyte 11 is preferably formed from membranes as thin as 3 mils, although satisfactory cells have been constructed with the electrolyte membrane as thick as 50 mils. The metal oxide depolarizer cathode may also comprise a layer as thin as ½ to 1 mil in thickness. Inert electrode 13 may be constructed of metal foils as thin as 0.5 mil.

When employing thick layers of the metal oxide depolarizer cathode, such as layers in excess of about 5 mils thickness, it is desirable to incorporate some carbon black in the cathode to increase its conductivity. However, for satisfactory operation of the cells of the present invention the cathode need not be thicker than 1 mil and in such case no carbon is required. In describing inert electrode 13 it should be understood that this electrode need not be constructed of metal. Graphite is a satisfactory inert electrode material and is desirable in some cell structures. However, since in the preferred cell, which is shown in Fig. 1, all of the elements are in the form of sheets, it is preferred to make electrode 13 out of a metal foil.

The surface area of the elements comprising the cells of the present invention may also vary within extremely wide limits. The only effect of changing the area of the cell elements with elements of a given thickness is to change the total current capacity of the cell, since the capacity of the cell with given element thicknesses is proportional to the area of the elements. Two effects are observed from changing the thickness of the elements of the cell. Thus, if the electrolyte 11 is thickened or the metal oxide depolarizer is thickened, the internal resistance of the cell is increased. Furthermore, as any of the elements is increased in thickness the voltage per unit length of the cell decreases. Therefore, for optimum results we prefer to make each of the elements of the cell as thin as possible consistent with structure requirements and the possibility that extremely thin elements may have voids therein which could lead to short circuiting of the cell.

Although I do not wish to be bound by theoretical considerations, it is believed that the reactions involved in the cells of the present invention are as follows. At the anode, the anode metal is oxidized to give metal ions which go into the electrolyte. At the same time metal ions from the electrolyte react with the metal oxide depolarizer and reduce the metal of the metal oxide cathode to a lower state of oxidation. Thus, with a zinc anode and a manganese dioxide cathode, the anode reaction involves oxidation of metallic zinc to zinc ions while in the cathode reaction, zinc ions react with manganese dioxide to form zinc oxide and manganese monoxide. From these theoretical considerations it is seen that the capacity of the cell is limited only by the amount of anode material or cathode material present. So far as the capacity of the cell is concerned, the amount of electrolyte present is immaterial and the amount and size of the inert electrode 13 is immaterial.

The following examples are illustrative of the practice of my invention and are not intended for purposes of limitation. The ion exchange resin membrane electrolytes were of two types. The first type, which will be referred to as "phenolic" was prepared by first reacting 100 parts by weight of phenol and 108 parts by weight of concentrated sulfuric acid at a temperature of from about 95 to 130° C. for about 3 hours until the phenol was sulfonated. The resulting sulfonated product was then added to 130 parts of 37 percent aqueous formaldehyde solution which was maintained at a temperature which did not rise above 10° C. At the end of the addition, a fine precipitate of sulfonated phenol formaldehyde resin was formed which was filtered from the reaction mixture. Ion exchange resin membranes were prepared from this resin by pouring the material into a closed mold and molding it to the desired thickness at 100° C. for about 1 hours. After being soaked in water the resulting membrane was in the hydrogen ion form and contained about 50 percent by weight of water. These membranes contained sufficient mobile hydrogen ions to provide 1.7 milliequivalents of hydrogen per gram of bone dry resin. The resistivity of this resin at 25° C. in the solvated form was 16 ohm-centimeters.

The second ion exchange resin membrane electrolyte will be referred to in the examples as the "polyethylene" membrane. These polyethylene membranes are available as Amberplex C-1 cation exchange membranes (Rohm and Haas Company) and are prepared by first polymerizing a mixture of about 95 parts by weight of styrene and about 5 parts by weight of divinyl benzene. The resulting polymer is comminuted to fine particles and 100 parts by weight of this finely divided polymerizate is sulfonated by reaction with about 175 parts of chlorosulfonic acid. This reaction is carried out by heating the mixture at its reflux temperature for about 3 minutes and then maintaining the mixture at room temperature for an additional 50 hours. The sulfonated product is then treated with a large excess of water to destroy the excess of chlorosulfonic acid and any acid chlorides which are formed. This results in a sulfonated resin containing 3.1 milliequivalents of mobile hydrogen ions per gram of resin. After drying this sulfonated resin, two parts by weight of the dried resin are mixed with one part by weight of polyethylene and the resulting mixture is pressed into sheet or membrane form. The resulting polyethylene membrane contains 2.1 milliequivalents of mobile hydrogen ions per gram of dry membrane. When this dried membrane is soaked in water, the resulting solvated product contains about 45 percent by weight of water.

The membranes described in the examples contain either zinc or magnesium as the mobile cation. The zinc ion form of the membranes is prepared by soaking the membranes in a 16 percent by weight solution of zinc sulfate in water for about 4 hours. At the end of this time the membrane is removed from the zinc sulfate solution and washed several times in water to remove all traces of zinc sulfate. The magnesium ion membranes are formed in a similar manner except that a 12 percent by weight solution of magnesium sulfate in water is employed.

In all of the examples when a solvation medium is described, the metal ion form of the resin membrane was solvated by soaking the membrane in a large excess of the solvation medium. Where the solvation medium contained some water, for example, a solution containing 10 percent water and 90 percent by volume of n-butanol, the resin was allowed to remain in the solvation medium until an equilibrium was established. In those cases where the solvation medium was substantially free of water, the resin membrane was allowed to stand in a first large excess of the solvation medium, was wiped dry and then allowed to stand in a second large excess of the medium. This large excess of the solvation medium had the effect of exchanging the solvation medium for the water with which the membrane was originally solvated.

In each of the examples the cell elements were formed of disks having a diameter of ¼". Each of the cells of the examples had the configuration of Fig. 1 and the following shorthand nomenclature is used to describe the cells.

Zn/Zn++/MnO₂/Pd (phenolic, 90% n-butanol)

The formula above indicates that the cell consisted of a zinc anode, an ion permeable resin membrance electrolyte in which zinc was the mobile ion, a manganese dioxide depolarizer electrode on palladium foil, with the electrolyte being the phenolic resin described above and being solvated with a solution containing 90 percent by volume of n-butanol and 10 percent by volume of water.

In the cells of the examples, the metal foils employed as anodes and inert electrodes had the following thicknesses: zinc—1 mil; magnesium—4 mils; palladium—2 mils; tantalum—0.5 mil; silver—1 mil; nickel—3 mils; and lead—3 mils.

In the examples the metal oxide depolarizer cathode was prepared by a number of different methods. Where manganese dioxide was employed with palladium as the inert electrode the palladium was anodized in a solution containing 7 percent by weight of manganous nitrate in water at a current density of about 5 milliamperes per square centimeter for 10 minutes. This gave a fine coherent deposit of manganese dioxide on the surface of the metal. With manganese dioxide as the cathode and tantalum as the inert electrode, tantalum was made the cathode in the solution of 2 percent potassium permanganate and 0.6 percent nitric acid in water. Using an inert palladium anode and a current density of about 5 milliamperes per square centimeter for 10 minutes a coherent black deposit of manganese dioxide was formed on the tantalum surface. Manganese dioxide has also been formed successfully upon silver and copper employing this same method. In those cells employing silver oxide as the cathode and silver as the inert electrode, the silver was made the anode in an aqueous solution containing 27 percent by weight of potassium hydroxide and about 3 percent by weight of lithium hydroxide with a palladium rod as a cathode. Current was passed through this cell at a current density (based on the anode area) of about 0.5 milliampere per square centimeter for times gradually increasing from 1 minute to 90 minutes with short circuiting of the electrolysis cell for a time sufficient to remove the black coating from the silver after each charging period except the last. This resulted in a coating of silver oxide on silver. The lead dioxide cathode-lead inert electrode assembly was prepared by anodizing lead foil with a palladium cathode in an aqueous electrolyte containing 2 moles per liter of sulfuric acid. The electrolysis cell was alternately charged and shorted in the manner previously described for silver oxide. The nickel oxide cathode on nickel inert electrode was formed by a chemical method which consisted of immersing a nickel foil in a commercial aqueous sodium hypochlorite solution (5 percent by weight) at 75° C. for 1 minute. This produced a thick deposit of nickel oxide on the nickel. Mercuric oxide cathodes were prepared by painting an aqueous suspension of red mercuric oxide in water on the metal electrode and subsequently evaporating the water.

The table below lists a number of cells within the scope of the present invention which were prepared. In each example the cell elements were circular with a diameter of ¼ inch. The cell of Example 2 represents the preferred embodiment of my invention.

*Table 1*

Example No.:
1—Zn/Zn++/MnO₂/Pd (phenolic, 90% ethylene glycol)
2—Zn/Zn++/MnO₂/Pd (phenolic, water)
3—Zn/Zn++/MnO₂/Pd (phenolic, 90% ethylene glycol)
4—Zn/Zn++/MnO₂/Pd (polyethylene, 90% n-butanol)
5—Zn/Zn++/MnO₂/Ta (polyethylene, 90% ethylene glycol)
6—Zn/Zn++/MnO₂/Ta (phenolic, 90% ethylene glycol)
7—Zn/Zn++/MnO₂/Pd (phenolic, methyl-β-hydroxyethylether)
8—Mg/Mg++/MnO₂/Pd (phenolic, ethylene glycol)
9—Zn/Zn++/AgO/Ag (phenolic, 90% ethylene glycol)
10—Zn/Zn++/AgO/Ag (phenolic, 90% ethylene glycol)
11—Zn/Zn++/AgO/Ag (phenolic, 90% dimethyl formamide)
12—Zn/Zn++/AgO/Ag (phenolic, 90% ethanol)
13—Zn/Zn++/AgO/Ag (polyethylene, 90% n-propanol)
14—Mg/Mg++/AgO/Ag (polyethylene, 90% n-propanol)
15—Zn/Zn++/Ni₂O₃/Ni (phenolic, 90% n-butanol)
16—Zn/Zn++/PbO₂/Pb (phenolic, 90% n-propanol)
17—Zn/Zn++/HgO/Ta (phenolic, 90% ethylene glycol)

Each of the cells described in Table I was evaluated at one or more different temperatures to determine its open circuit voltage and the flash current obtainable from the cell. The flash currents of these cells was the instantaneous current observed when these cells were short circuited through an ammeter. The results of these tests are recorded in Table II below. Specifically, Table II lists the thickness of the ion permeable resin membrane electrolytes of the cells of Table I, the thickness of the metal oxide depolarizer cathode, the temperatures at which electrical properties were measured, and the electrical properties.

Table II

| Example No. | Electrolyte Thickness, Mils | Cathode Thickness, Mils | Temp., °C | Open Circuit Voltage, Volts | Flash Current, Microamperes |
|---|---|---|---|---|---|
| 1 | 6 | 0.1 | 27 | 1.58 | 480 |
|   |   |   | 0 | 1.51 | ---- |
|   |   |   | -42 | 1.42 | 11 |
|   |   |   | -60 | 1.30 | ---- |
| 2 | 6 | 0.1 | 27 | 1.34 | 3,600 |
|   |   |   | 0 | 1.34 | 1,000 |
|   |   |   | -20 | 1.32 | 220 |
|   |   |   | -41 | 1.08 | ---- |
| 3 | 11 | 0.1 | 25 | 1.25 | 240 |
|   |   |   | -9 | 1.25 | ---- |
|   |   |   | -40 | 1.24 | ---- |
| 4 | 10 | 0.1 | 27 | 1.47 | 200 |
|   |   |   | 0 | 1.45 | ---- |
|   |   |   | -45 | 1.07 | ---- |
| 5 | 7 | 0.1 | 27 | 1.50 | 45 |
|   |   |   | -30 | 1.38 | ---- |
| 6 | 6 | 0.1 | 27 | 1.57 | 130 |
| 7 | 7 | 0.1 | 27 | 1.46 | 260 |
|   |   |   | -22 | 1.38 | ---- |
| 8 | 10 | 0.1 | 26 | 1.73 | ---- |
|   |   |   | -12 | 1.68 | ---- |
| 9 | 4 | 0.05 | 27 | 1.45 | 1,400 |
| 10 | 7 | 0.05 | 27 | 1.42 | 330 |
|   |   |   | 0 | 1.42 | 110 |
|   |   |   | -40 | 1.33 | ---- |
|   |   |   | -64 | 1.18 | ---- |
| 11 | 9 | 0.05 | 27 | 1.55 | 380 |
|   |   |   | 0 | 1.35 | 40 |
| 12 | 5 | 0.05 | 27 | 1.50 | 480 |
| 13 | 7 | 0.05 | 27 | 1.52 | 50 |
|   |   |   | -45 | 1.37 | ---- |
| 14 | 7 | 0.05 | 27 | 1.91 | ---- |
|   |   |   | 0 | 1.89 | ---- |
|   |   |   | -41 | 1.77 | ---- |
| 15 | 8 | 1.0 | 27 | 0.8 | 1.2 |
| 16 | 6 | 1.0 | 27 | 0.65 | 32 |
| 17 | 6 | 1.0 | 27 | 1.35 | 1 |

The cell of Example 4 was examined under various load conditions and Table III below lists the voltage current characteristics of this cell under various loads.

Table III

[Cell of Example 4]

| Load Resistance (Megohms) | Voltage (Volts) | Current (Microamperes) |
|---|---|---|
| Open Circuit | 1.47 | 0 |
| 1 | 1.41 | 1.4 |
| 0.50 | 1.36 | 2.7 |
| 0.25 | 1.31 | 4.2 |
| 0.10 | 1.20 | 12 |

Previously it was mentioned that the cells of the present invention are capable of voltages per inch of about 200 volts. This is seen from an examination of the cell of Example 6. It will be seen that the elements comprising the cell of Example 6 have a total thickness of less than 8 mils. Since the open circuit voltage of this cell is 1.57 volts, the cell produces about 200 volts per inch.

Although the examples describe only a limited number of anode materials, electrolyte materials, cathode materials and inert electrode materials, it should be understood that a wide variety of materials may be employed in the cells of the present invention. The only limitations on the materials of construction of the various cell elements are those limitations previously described.

As shown from Fig. 2, a number of the cells of Fig. 1 may be placed in series to provide a battery having as high a voltage as desired. Fig. 2 is a cutaway view of such a battery showing anodes 14, ion exchange resin membrane electrolytes 15, metal oxide cathode depolarizers 16, and inert electrodes 17. The entire assembly is encased in a suitable housing 18, such as a plastic resin housing and leads 19 and 20 extend from anode and cathode respectively through the casing to provide a method of attaching the battery in any desired circuit.

Figs. 3 and 4 illustrate a rolled, cylindrical cell within the scope of the present invention. As shown in Fig. 4 the cell elements comprise strips such as strip anode 21, strip electrolyte 22, strip cathode 23, strip inert electrode 24, and a strip 25 of insulating material. The strips of Fig. 4 are then rolled into the shape shown in Fig. 3 and encased in any suitable material 26, such as a synthetic resin. Suitable leads (not shown) are connected to the anode and cathode to provide electrical connections to the cell.

In addition to the structure shown in the drawing, it is also possible to fabricate cells of the present invention in a shape somewhat analogous to the shape of the conventional flashlight battery. This can be accomplished, for example, by electrodepositing a layer of cathode material such as manganese dioxide on a carbon rod, surrounding this cathode with a layer of ion exchange resin membrane electrolyte containing a mobile metallic cation, such as, for example, a zinc cation and placing the entire assembly in a metallic can, such as, for example, a zinc can. The carbon then serves as the inert electrode and the zinc can serves as the anode.

The cells of the present invention have a number of obvious uses. The most important uses of these cells is in applications where very high voltages are required at low currents, particularly where small overall cell volume is required. Such uses include power supplies for Geiger counters, ionization chambers, deflection or intensifier voltages in cathode ray tubes, and the like.

What I claim as new and desire to secure by Letters Patent of the United States is:

1. A solid state primary electric cell comprising a metal anode, an ion exchange resin membrane electrolyte having as its mobile cation the cation of the metal anode, and a metal oxide depolarizer cathode, said ion exchange resin membrane electrolyte being the sole electrolyte in said cell.

2. The cell of claim 1 in which the anode is formed of zinc.

3. The cell of claim 1 in which the anode is magnesium.

4. The cell of claim 1 in which the cathode is manganese dioxide.

5. The cell of claim 1 in which the cathode is silver peroxide.

6. The cell of claim 1 in which the cathode is mercuric oxide.

7. The cell of claim 1 in which the cathode is $PbO_2$.

8. The cell of claim 1 in which the cathode comprises $Ni_2O_3$.

9. The cell of claim 1 in which the ion exchange resin membrane electrolyte comprises a sulfonated phenol formaldehyde resin.

10. The cell of claim 1 in which the electrolyte is a sulfonated copolymer of styrene and divinyl benzene.

11. A solid state primary electric cell comprising a zinc anode, a cation permeable ion exchange resin membrane electrolyte having zinc as its mobile ion, and a manganese dioxide cathode, said ion exchange resin membrane electrolyte being the sole electrolyte in said cell.

12. A solid state primary electric cell comprising a magnesium anode, a cation permeable ion exchange resin membrane electrolyte having magnesium ions as its mobile cation, and a manganese dioxide cathode, said ion exchange resin membrane electrolyte being the sole electrolyte in said cell.

13. A solid state primary electric cell comprising a metal anode, a cation permeable ion exchange resin membrane electrolyte having as its mobile cation the ion of the metal anode, a metal oxide depolarizer cathode, and an inert electrode in contact with said cathode, said ion exchange resin membrane electrolyte being the sole electrolyte in said cell.

14. A solid state primary electric cell comprising a metal anode, a substantially saturated solvated cation permeable ion exchange resin membrane electrolyte having as its mobile cation the ion of the metal anode, and a metal oxide depolarizer cathode, said ion exchange resin membrane electrolyte being the sole electrolyte in said cell.

15. The cell of claim 14 in which the solvation medium is water.

16. The cell of claim 14 in which the solvation medium is an aqueous alcoholic solution.

17. The cell of claim 14 in which the solvation medium is aqueous dimethyl formamide.

18. A solid state primary electric cell comprising a zinc anode, a substantially saturated solvated cation permeable ion exchange resin membrane having zinc as its mobile cation, and a manganese dioxide depolarizer cathode, said ion exchange resin membrane being the sole electrolyte in said cell.

19. A solid state primary electric cell comprising a magnesium anode, a substantially saturated solvated cation permeable ion exchange resin membrane electrolyte having magnesium ions as its mobile cation, and a manganese dioxide depolarizer cathode, said ion exchange resin membrane electrolyte being the sole electrolyte in said cell.

20. A battery comprising a plurality of serially connected solid state primary electric cells, each of said cells comprising a metal anode, a substantially saturated solvated cation permeable ion exchange resin membrane electrolyte having as its mobile cation the ion of the metal anode, and a metal oxide depolarizer cathode, said ion exchange resin membrane electrolyte being the sole electrolyte in said cell.

References Cited in the file of this patent

UNITED STATES PATENTS

| | | |
|---|---|---|
| 2,636,851 | Juda et al. | Apr. 28, 1953 |
| 2,700,063 | Mänecke | Jan. 18, 1955 |
| 2,702,272 | Kasper | Feb. 15, 1955 |
| 2,762,858 | Wood | Sept. 11, 1956 |